March 11, 1941. R. S. NELSON ET AL Re. 21,744

ABSORPTION REFRIGERATING APPARATUS

Original Filed Aug. 14, 1933 2 Sheets-Sheet 1

Inventor:
Rudolph S. Nelson
Earl Babcock.
By Harry S. Bucarse Atty.

March 11, 1941. R. S. NELSON ET AL Re. 21,744

ABSORPTION REFRIGERATING APPARATUS

Original Filed Aug. 14, 1933 2 Sheets-Sheet 2

Inventor:
Rudolph S. Nelson
Earl Babcock.

By Harry S. Dwiggins Atty.

Reissued Mar. 11, 1941

Re. 21,744

UNITED STATES PATENT OFFICE 21,744

ABSORPTION REFRIGERATING APPARATUS

Rudolph S. Nelson, Larchmont, N. Y., and Earl Babcock, Duncan, Okla., assignors to The Hoover Company, North Canton, Ohio, a corporation of Ohio Original No. 1,993,380, dated March 5, 1935, Serial No. 685,038, August 14, 1933. Application for reissue March 3, 1937, Serial No. 128,812

9 Claims. (Cl. 62—119.5)

This invention relates to continuous absorption refrigerating apparatus and more particularly to that type which employs an inert gas or the like as an auxiliary pressure equalizing medium.

In the copending application of Rudolph S. Nelson, Serial No. 685,037 filed August 14, 1933, a continuous absorption refrigeration system having an absorber in two sections with parallel flow of inert gas through each section is disclosed and claimed. This copending application contains claims which are generic to the invention claimed herein.

It is an object of the present invention to provide a continuous absorption refrigerating system of the type referred to with an absorber so constructed as to provide a large heating radiating surface. This feature is particularly adapted for use in an air-cooled system.

It is another object of the invention to provide an improved arrangement for the bringing of the absorption liquid and the refrigerant gas to be absorbed into intimate contact.

It is a further object to provide a novel combination of inert gas circuits and absorption liquid circuits in the absorber so as to provide a construction which is capable of rapid absorption of the refrigerant and so that the absorber may be compact, simple and inexpensive.

It is still another object of the invention to provide means for dividing a stream of absorption liquid into two streams and to cause the two divided streams to carry substantially equal amounts of absorption liquid even though the apparatus is not level.

Various other objects and advantages reside in certain novel features of the arrangement and construction of parts as will be apparent from a consideration of the following description taken in connection with the accompanying drawings in which.

Figure 1:
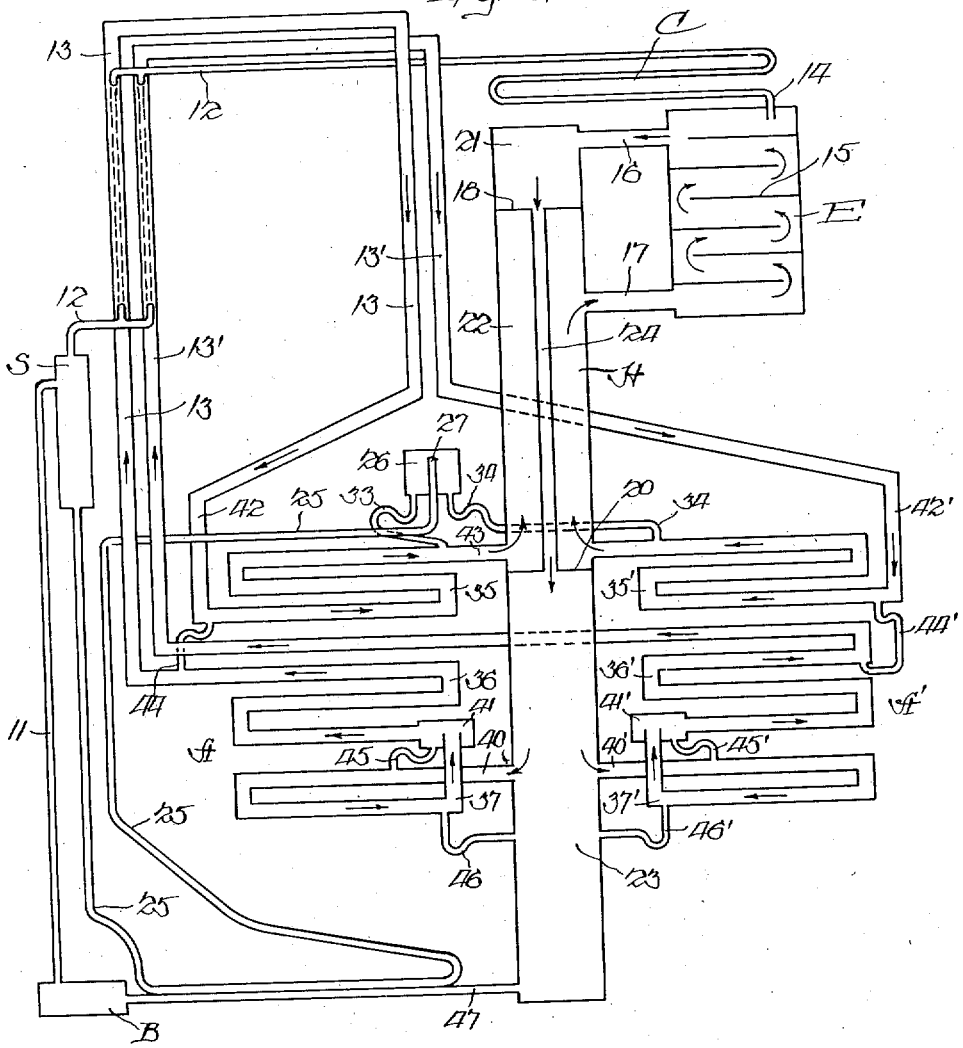
Figure 1 is a diagram of the absorption refrigerating system illustrating the principles of the present invention.
Figure 2:
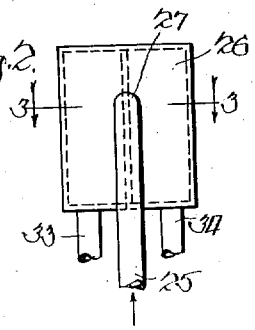
Figure 2 is a view in elevation of a detail of the device for dividing the stream of absorption liquid in the apparatus illustrated in Figure 1.
Figure 3:
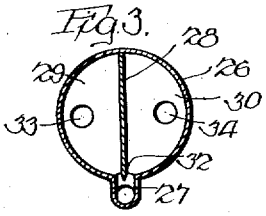
Figure 3 is a horizontal cross-sectional view of the device of Figure 2 being taken on the line 3—3 of Figure 2.

Referring to the drawings in detail and particularly to the arrangement of Figures 1 to 3, it will be seen that a continuous absorption refrigerating system is illustrated as made up of a boiler B, a gas separating chamber S, a condenser C, an evaporator E, a gas heat exchanger H, and an absorber having two sections designated generally as A and A', together with associated conduits and connecting devices which go to make up the complete refrigerating system.

A conduit 11 which acts as a vapor lift pump connects the boiler B to the upper end of the gas separating chamber S. The conduit 11 conveys refrigerant gas generated in the boiler B and also the absorption liquid into the gas separating chamber S. The refrigerant gas passes upwardly through a conduit 12 which for a portion of its length is divided into two arms which extend through gas conduits 13 and 13' which will be described hereinafter. The pipe 12 leads the refrigerant gas to the condenser C where it is liquified and flows through the conduit 14 into the evaporator E.

The evaporator E consists merely of a vertically disposed cylindrical vessel provided with a number of baffle plates 15 therein. The top of the evaporator is connected by means of a gas conduit 16 with the upper portion of the gas heat exchanger while another gas conduit 17 connects the lower portion of the evaporator to the central portion of the gas heat exchanger.

The gas heat exchanger H consists of a vertical cylinder which extends from a point near the top of the evaporator to the bottom of the unit. Partitions 18 and 20 located at space points in the cylinder divide it into three compartments designated 21, 22 and 23. A tube or a number of tubes 24 (only one being shown in the drawings) connect the upper chamber 21 to the lower chamber 23.

Absorption liquid conveyed through the gas separating chamber S by the conduit 11 leaves the lower end of the chamber S through the conduit 25 which extends down to or below the level of the boiler B, and thence upwardly into a small vessel 26, shown in detail as Figures 2 and 3. Just as the conduit 25 enters the vessel 26 it is bent into a horizontal plane, this portion of the conduit 25 being designated 27. Inside of the vessel 26 a vertical partition 28 extends from top to bottom, dividing the vessel into two compartments designated 29 and 30. These compartments are connected only through the horizontal portion 27 of the conduit 25. As shown in Figure 3, the dividing plate or partition 28 is located on the center line of the horizontal portion 27 of the conduit 25 so that as absorption liquid enters the vessel 26 from the conduit 25 the stream is divided, one part falling into the compartment 29 and the other part into the compartment 30. The partition 28 is preferably provided with a knife edge as indicated in 32 (Figure 3) so as to accurately divide the stream of absorption liquid at this point into two equal streams.

The conduit 33, provided with a slight U-bend, constitutes means for conveying absorption liquid out of the compartment 29 of the vessel 26 while a conduit 34, also provided with the U-bend, constitutes means for conveying absorption liquid out of the compartment 30 of this vessel. The conduits 33 and 34 are connected respectively to the absorber sections A and A'.

In the arrangement illustrated each absorber section is provided with three stages, those of the section A being designated 35, 36, and 37 and those of the section A' being designated 35', 36' and 37'. It will be apparent from an inspection of the drawings that the absorber sections A and A' are exactly similar, hence only one section will be described and it will be understood that the other section is similarly constructed and connected to the gas heat exchanger and other parts of the system.

Each stage of the absorber section A consists of a number of horizontal pipes bent or coiled to provide a sinuous path for the flow of fluids therethrough. The stages are connected together for the flow of inert gas in series therethrough and also for the flow of absorption liquid in series therethrough although the sequence for the absorption liquid differs from that of the inert gas.

The inert gas flows through the gas heat exchanger H in the direction indicated by the arrows and enters the absorber section A at the lower stage 37 thereof through the conduit 40. The gas flows through the lower stage 37 in parallel with the absorption liquid. It then enters a small vessel 41 which is connected to the lower end of the stage 36. After flowing through the stage 36 in counter flow with the liquid, the gas enters the left-hand leg (as viewed in Figure 1) of on inverted U-shaped conduit 13 in which it flows upwardly due to the heating effect resulting from the location of one branch of the conduit 12 therein. The gas then flows across the top of the unit in the horizontal portion of conduit 13 and downwardly through the right-hand leg thereof, this leg being cooler than the left-hand leg, since it is exposed to the atmosphere. The gas then flows through the conduit 42 into the upper stage 35 of the section A and after flowing through this stage in counterflow with the liquid passes into the central compartment 22 of the gas heat exchanger through the conduit 43.

Absorption liquid enters the absorber through the conduit 33, connected to the upper portion of the upper stage 35 of the section A. The liquid trickles downwardly through this stage and then passes through a conduit 44 which has a U-bend therein into the intermediate stage 36. After trickling downwardly through this stage it flows through a conduit 45 connected to the bottom of the small vessel 41 and into the top of the lower stage 37. From the lower stage 37 the absorption liquid flows through the conduit 46 into the lower compartment 23 in the gas heat exchanger. The lower end of the compartment 23 acts as a reservoir for the absorption liquid and is connected to the boiler B by means of a liquid conduit 47. A portion of the conduit 47 is in heat exchange relation with a portion of the liquid conduit 25.

It will be apparent that the various stages of the absorber section A, and A' may be interposed or interspersed with one another so as to be compactly assembled while at the same time providing large radiating surface. The entire absorber may be located below the food storage compartment of an ordinary household refrigerator cabinet.

It will be apparent from the above description that the various conduit vessels of the system are in open communication, and that substantially the same pressure prevails throughout. In accordance with usual practices the apparatus may be charged with ammonia as refrigerant, water as absorption liquid and hydrogen as the auxiliary medium, although the system is not limited to the use of these fluids.

In operation three cycles of circulation are set up, the refrigerant passing from the boiler B through the conduit 11, the gas separating chamber S, the conduit 12, the condenser C, the evaporator E, where it is vaporized and then conveyed by the inert gas through the compartment 21 of the gas heat exchanger, the tube or tubes 24, the compartment 23 and the gas conduit 40 into the absorber. In the absorber the refrigerant is absorbed by the absorption liquid and conveyed back to the boiler through the conduit 46, the lower compartment 23 of the gas heat exchanger and the conduit 47.

The absorption liquid passes through a cycle starting with the boiler B through the vapor lift pump conduit 11, the gas separating chamber S, the liquid conduit 25, the small vessel 26 where the solution divides into two streams, one flowing through the conduit 33 and the absorber section A, the other flowing through the conduit 34 and the absorber section A'. Both streams combine in the reservoir portion 23 of the gas heat exchanger and flow back to the boiler through the conduit 47.

The inert gas passes through a cycle starting with the evaporator E through the gas conduit 16, the upper compartment 21 of the gas heat exchanger, the tube or tubes 24, the lower compartment 23 where the gas stream divides, one part flowing through the absorber section A in the direction described above and indicated by the arrows, and the other part flowing through the absorber section A'. The two gas streams combine again in the intermediate compartment 22 of the gas heat exchanger and flow back to the evaporator through the gas conduit 17.

It will be noted that the construction causes both the gas stream and the absorption liquid stream to divide into two parts. If the two paths for the inert gas are of about the same length, the divided streams will normally be about equal.

Considerable difficulty has been experienced in attempting to cause an absorption liquid to divide equally, however, especially where the refrigerating system operates with substantially the same total pressure prevailing in the various vessels and only a slight head of liquid is available, but the solution divider of Figures 2 and 3 will be found to be satisfactory where the unit as a whole is maintained substantially level. A modified form of this type of solution divider is illustrated in Figures 4 and 5.

In Figures 2 and 3 the solution is flowing in a horizontal plane at the point where it is divided. In Figures 4 and 5 the solution is flowing upwardly as it is divided. It will be found that where the solution flow is small, surface tension of the absorption liquid on the wall of the conduit plays an important part in directing the flow of the two streams at the point where they divide. The arrangement of Figures 4 and 5 has been designed to prevent surface tension from unduly effecting the division of the liquid stream. In this construction the supply conduit to the divider is designated as 25, while the conduits for conveying the divided streams away from the divider are designated as 33 and 34, just as in Figure 1.

Figure 4:
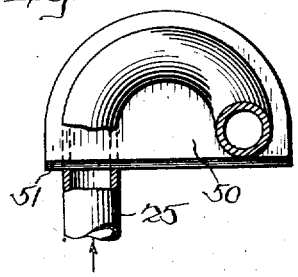
Figure 4 is a cross-sectional view of a modified form of dividing device.
Figure 5:
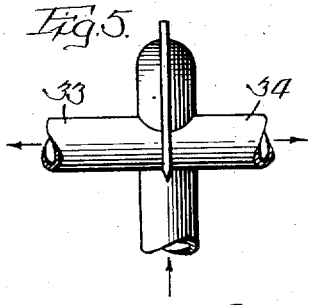
Figure 5 is a view in elevation of the device of Figure 4.

As shown in Figure 4 the upper end of the conduit 25 is bent into the form of a hook and joined as by an ordinary T union with the conduits 33 and 34. The entire hooked portion of the conduit 25 and the T union may then be slit on a vertical plane by means of a hand saw or the like, and a metal disc 50 inserted and welded centrally of the hook portion of the conduit 25, dividing the T union into two parts. The lower edge of the plate 50 may be provided with a knife edge as indicated at 51 to facilitate accurate division of the liquid stream flowing upwardly in the conduit 25. Since the stream is divided at the point of the knife edge 51 it flows upwardly some distance before passing over the bent or hooked portion of the conduit 25.

Figure 6:
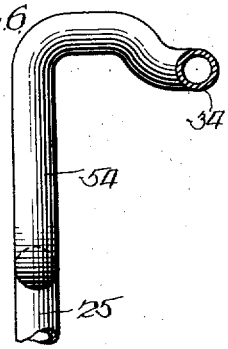
Figure 6 is a side view of a still further modification of a divider for the solution.
Figure 7:
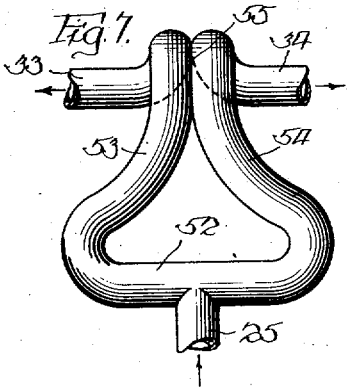
Figure 7 is a view in elevation of the device of Figure 6.

Figures 6 and 7 show a further modification of a liquid divider. In this construction the supply conduit 25 is joined by means of an ordinary T union to a conduit 52 which has a horizontal portion and two upwardly extending legs 53 and 54 which are brought into very close proximity at the point 55 where they are bent into a hooked shape and inclined slightly downwardly to join the outlet conduits 33 and 34. With this construction the solution divides in the horizontal portion of the conduit 52 but due to the proximity of the legs 53 and 54 considerable tilting of the unit will not materially affect the division of the liquid stream. Tilting of the unit about the horizontal portion of the conduit 52 will not affect the relative height of the upper portion of the two legs 53 and 54. Tilting the unit about the vertical axis of the pipe 25 (as shown in Figure 7) to either the right or the left will only raise the upper end of either the leg 53 or 54 in a very slight distance over that of the other leg and hence the solution will be divided substantially equally.

Figure 8:
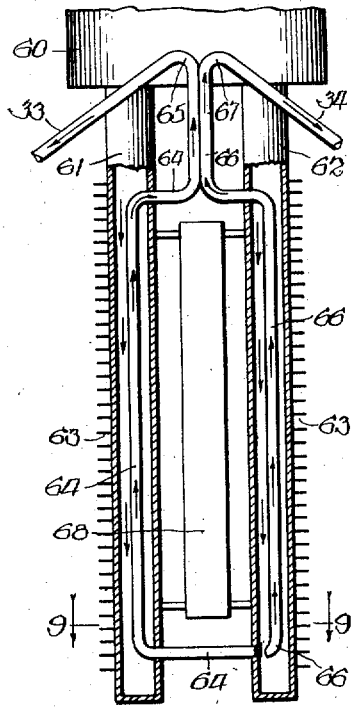
Figure 8 is a view in elevation of the still further form of solution divider, certain of the parts being cut away to illustrate the construction.
Figure 9:
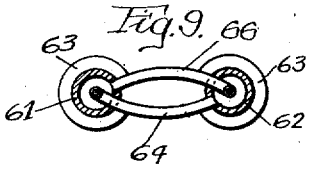
Figure 9 is a horizontal cross-sectional view of the lower portion of the device of Figure 8, the view being taken on the lines 9—9 of Figure 8

The solution divider of Figures 8 and 9 operates upon a different principle than those discussed above. n that it does not rely entirely upon the division of the stream as the result of the proximity of the conduits. This arrangement is of advantage, however, only where a change in temperature takes place in the liquid to be divided at some point in its circuit. In accordance with the arrangement illustrated, the liquid to be divided is supplied to a tank or vessel 60. This vessel may be the gas separating chamber S of Figure 1, or it may be a small vessel like that designated 26 in Figure 1, provided the solution is not brought to atmospheric temperature before it enters this vessel. Connected to the vessel 60 and depending therefrom are two cylinders designated 61 and 62 which are closed at the bottom. These cylinders are provided with heat radiating fins indicated at 63. The bottom of each of the cylinders 61 and 62 is connected to a pipe which passes upwardly through the center of the other cylinder. Thus the conduit 64 connects the bottom of the cylinder 62 and passes upwardly through the center of the cylinder 61. It leaves the cylinder 61 near the top thereof and passes upwardly to the point 65 where it makes a sharp bend and is joined to the outlet conduit 33. Another pipe 66 is connected to the bottom of the cylinder 61 (see Figure 9) and passes up through the central portion of the cylinder 62, leaving this cylinder near the top thereof and passing as close as possible to the upper end of the pipe 64 where it makes a similar reverse bend as indicated at 67 and then joins the outlet conduit 34. A strip of insulation such as is indicated at 68 should be placed between the two cylinders 61 and 62.

The operation of the solution divider of Figures 8 and 9 results from the fact that the solution flowing therethrough is being cooled as it passes from the vessel 60 to the conduits 33 and 34. Due to the location of the bends 65 and 67 in the pipes 64 and 66, as long as the unit is level the solution will be substantially equally divided. If the unit is tipped slightly, however, say for the purpose of illustration, to the right, the bend 65 will be slightly higher than the bend 67. In this condition slightly more liquid will flow through the pipe 66 than through the pipe 64, temporarily. As soon as this condition exists more absorption liquid will flow through the cylinder 61 than through the cylinder 62 because the cylinder 61 supplies liquid to the conduit 66. If the liquid in the vessel 60 is warm, as soon as liquid flows through the cylinder 61 to a greater extent than through the cylinder 62 the temperature of the liquid in the cylinder 61 will be higher than that in the cylinder 62. Likewise the temperature of the liquid in the pipe 64 will be higher than that in the pipe 66. This will result in a slight expansion of the liquid in the pipe 64 so that its density will be less than that in the pipe 66 and the level of liquid in the pipe 64 at the bend 65 will be raised sufficiently to overcome the slight increase in height of this point over that of the bend 67 due to the tilting of the unit. Thus the flow in the pipes 33 and 34 will be equalized. Likewise when the unit tips to the left the density of the liquid in the pipe 66 will be less than that in the pipe 64 and the flow will remain balanced.

Figure 10:
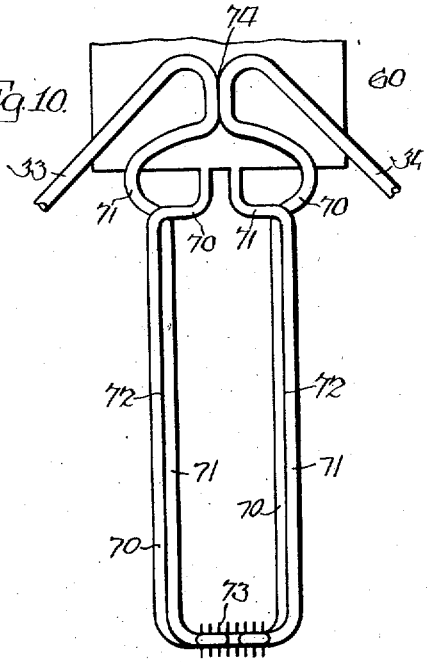
Figure 10 is a view in elevation of a still further form of solution divider.

Figure 10 discloses a solution divider which is similar to that of Figures 8 and 9 except for details of construction. In the arrangement of Figure 10 the lower portion of the cylinder 60 is connected to two U-shaped conduits which have portions in heat exchange relation. These U-shaped conduits are designated 70 and 71. The legs of each U-shaped conduit are welded together or otherwise arranged to transfer heat from one to the other as indicated 72. The vertical leg portions of the U-conduits 70, 71 may be wrapped with insulation to prevent a large discharge of heat therefrom. The lower or horizontal portion of these conduits are provided with heat radiating fins as indicated at 73 and this horizontal portion may be reversely bent to provide sufficient heat radiating surface.

It will be seen that one leg of each of the conduits 70 and 71, that is, the outlet leg of each conduit, passes up into proximity with the corresponding leg of the other at the point 74 before passing downwardly to join the conduits 33 and 34. It will be apparent that since the legs of the U-pipe 70 and 71 are in heat exchange relation the system will operate the same as that of Figures 8 and 9. Thus, for example, should more absorption liquid flow temporarily through the conduit 70 the left hand leg of this conduit will be at a higher temperature than the right hand leg, due to the fact that some heat has been discharged at the part 73. This will cause the liquid in the left hand leg of the conduit 71 to expand thus equalizing the flow through the conduits.

Various changes may be made in the construction without departing from the spirit of the invention or the scope of the annexed claims.

We claim:

1. A continuous absorption refrigerating system including an evaporator, an absorber constructed in two sections, means for circulating an inert gas between and through the evaporator and the absorber, the flow being in parallel paths through the two sections, a boiler and an arrangement for circulating an absorption liquid between the boiler and the absorber, said arrangement including a device for separating a stream of liquid into two streams and conduct means for conveying the two streams horizontally in close proximity above said separating device whereby the liquid may flow to said absorbed sections in parallel paths.

2. A continuous absorption refrigerating system including an evaporator, an absorber constructed in two sections, means for circulating an inert gas between and through the evaporator and the absorber, the flow being in parallel paths through the two sections, a boiler and means for circulating an absorption liquid between the boiler and the absorber, the liquid flowing through said absorber sections in parallel paths, said last mentioned means including a solution divider consisting of a small vessel, a horizontal conduit connected to the vessel, a vertical partition in the vessel adjacent the horizontal conduit and outlet conduits connected to the vessel on opposite sides of said parition.

3. A continuous absorption refrigerating system including an evaporator, an absorber constructed in two sections, means for circulating an inert gas between and through the evaporator and the absorber, the flow being in parallel paths through the two sections, a boiler and means for circulating an absorption liquid between the boiler and the absorber, the liquid flowing through said absorber sections in parallel paths, said last mentioned means including a solution divider consisting of vertically extending conduit having a hooked portion at its upper end and a plate located centrally of said hooked portion and extending beneath the hooked portion to divide the upper end of said vertical portion and the hooked portion into two parts.

4. A continuous absorption refrigerating system including an evaporator, an absorber constructed in two sections, means for circulating an inert gas between and through the evaporator and the absorber, the flow being in parallel paths through the two sections, a boiler and means for circulating an absorption liquid between the boiler and the absorber, the liquid flowing through said absorber sections in parallel paths, said last mentioned means including a solution divider consisting of a vessel adapted to receive the liquid at a temperature above that of the atmosphere and two conduits associated with said vessel the conduits having portions in heat exchange relation with each other and portions exposed to the atmosphere.

5. A continuous absorption refrigerating system of the hermetically sealed type including an evaporator, an absorber constructed in two sections, means for circulating an auxiliary pressure equalizing agent between and through the evaporator and the absorber, a boiler and means for circulating an absorption liquid between the boiler and the absorber at a rate materially below the capacity of said solution circuit forming means, said last mentioned means including a solution divider for dividing the stream of liquid flowing to the absorber into two streams, one for each of said sections, and an arrangement for causing the divided streams to flow horizontally at points in close proximity to each other whereby the absorption liquid may flow through said sections in parallel paths.

6. A continuous absorption refrigerating system of the hermetically sealed type including an absorber having a plurality of sections, a single boiler and means for circulating an absorption liquid between the boiler and the absorber at a rate materially below the capacity of said solution circuit forming means, said means including an arrangement for dividing the stream of liquid flowing to the absorber into as many streams as there are sections in the absorber and an arrangement for causing the divided streams to flow horizontally at points in close proximity to each other whereby the absorption liquid may flow through said sections in parallel.

7. In an absorption refrigerating system having a boiler, an absorber having a plurality of parts and means for circulating absorption liquid between the boiler and absorber, a combined precooler and solution divider for dividing the absorption liquid flowing to the absorber, into as many streams as there are parts in the absorber comprising a vessel adapted to receive absorption liquid at a higher temperature than a cooling medium and conduits connecting said vessel to said parts, said conduits each having a portion exposed to the cooling medium and a portion in heat exchange relation with another conduit.

8. An absorption refrigeration system comprising in combination an evaporator, an air-cooled absorber having a plurality of sections, and a boiler assembly connected in circuit, means providing a path for the circulation of absorption solution between said boiler and said absorber, means operable to circulate absorption solution over said path at a predetermined rate, and means within said system to positively divide the circulating absorption solution between said absorber sections, said means being so constructed and arranged as not to substantially obstruct the free gravity flow of absorption solution and to divide the solution into a plurality of streams irrespective of sudden variations in the rate of solution circulation.

9. In combination with conduits providing a closed fluid circuit between a boiler and an absorber of an absorption refrigeration system of the type charged with a refrigerant and an absorbent medium therefor, a liquid divider comprising a supply conduit and a plurality of discharge conduits, all of which are free of internal elements which will obstruct the free gravity flow of liquid therethrough, said conduits being so constructed and arranged with respect to one another that a liquid stream delivered to said supply conduit is positively divided between said discharge conduits.

RUDOLPH S. NELSON.
EARL BABCOCK.